US012619107B2

(12) United States Patent
Perrot et al.

(10) Patent No.: US 12,619,107 B2
(45) Date of Patent: May 5, 2026

(54) PHOTOGRAPHY AND THERMOGRAPHY COMBINING METHOD OF OBTAINING A FITTING PARAMETER TO FIT AN OPHTHALMIC LENS INTO A SPECTACLE FRAME

(71) Applicant: Essilor International, Charenton-le-Pont (FR)

(72) Inventors: Stéphane Perrot, Saint-Maur-des-Fosses (FR); Shuang Ding, Charenton-le-Pont (FR)

(73) Assignee: Essilor International, Charenton-le-Pont (FR)

( * ) Notice: Subject to any disclaimer, the term of this patent is extended or adjusted under 35 U.S.C. 154(b) by 357 days.

(21) Appl. No.: 18/563,072

(22) PCT Filed: May 25, 2022

(86) PCT No.: PCT/EP2022/064315
§ 371 (c)(1),
(2) Date: Nov. 21, 2023

(87) PCT Pub. No.: WO2022/248612
PCT Pub. Date: Dec. 1, 2022

(65) Prior Publication Data
US 2024/0231127 A1    Jul. 11, 2024

(30) Foreign Application Priority Data
May 28, 2021    (EP) ..................................... 21305711

(51) Int. Cl.
*G02C 13/00*    (2006.01)
*G02C 7/02*    (2006.01)

(52) U.S. Cl.
CPC ........... *G02C 13/005* (2013.01); *G02C 7/027* (2013.01)

(58) Field of Classification Search
None
See application file for complete search history.

(56) References Cited

U.S. PATENT DOCUMENTS 5,926,247 A  *  7/1999  Kimura ................ G02C 13/003
                                                         351/178
7,740,355 B2 *  6/2010  Sessner ................ G02C 13/005
                                                         351/204

(Continued)

FOREIGN PATENT DOCUMENTS

CN          104160416 A      11/2014
DE    10 2004 063 160 A1      7/2006

(Continued)

OTHER PUBLICATIONS

International Search Report and Written Opinion issued Aug. 9, 2022 in PCT/EP2022/064315 filed on May 25, 14 pages.

(Continued)

*Primary Examiner* — Darryl J Collins
(74) *Attorney, Agent, or Firm* — Oblon, McClelland, Maier & Neustadt, L.L.P.

(57)    ABSTRACT

A photography and thermography combining method of obtaining, for a chosen spectacle frame model of a spectacle wearer, at least one fitting parameter to fit an ophthalmic lens into the spectacle frame model. The method includes taking a photograph of the wearer's face with spectacles having the chosen spectacle frame model, taking a thermogram of the wearer's face with the spectacles, identifying the spectacles' contour in the thermogram, overlaying the identified contour or a boxing shape derived from the identified contour onto the photograph, thus obtaining a composite image, and obtaining the at least one fitting parameter from the composite image.

15 Claims, 7 Drawing Sheets

(56) References Cited

U.S. PATENT DOCUMENTS

| 11,238,611 B2 * | 2/2022 | Barton .................... G06V 10/82 |
| 2003/0123026 A1 * | 7/2003 | Abitbol .............. G06Q 30/0641 |
| | | 351/204 |
| 2019/0271858 A1 | 9/2019 | Nieuwenhuis et al. |
| 2022/0404645 A1 * | 12/2022 | Nieuwenhuis ....... G02C 13/005 |

FOREIGN PATENT DOCUMENTS

| EP | 3 051 332 A1 | 8/2016 |
| EP | 3 109 795 A1 | 12/2016 |
| EP | 3 355 104 A1 | 8/2018 |
| WO | WO 2020/015822 A1 | 1/2020 |
| WO | WO 2020/064755 A1 | 4/2020 |

OTHER PUBLICATIONS

ISO standard 8624:2020(en), "Revision of ISO 8624:2002 Ophthalmic optics—Spectacle frames—Measuring system and terminology", New Work Item Proposal issued Aug. 25, 2008, 22 pages.

Zheng, "Face detection and eyeglasses detection for thermal face recognition", Proceedings of SPIE—The International Society for Optical Engineering—Feb. 2012, 12 pages.

Grigat et al., "Robust Eye Detection under Active Infrared Illumination", Proceedings of the 18th International Conference on Pattern Recognition, 2006, 5 pages.

Bebis et al., "Face recognition by fusing thermal infrared and visible imagery", Science Direct, Image and Vision Computing, 24 (2006), 727-742, 2006, 16 pages.

Combined Chinese Office Action and Search Report issued on Oct. 15, 2025 in Chinese Patent Application No. 202280035203.7 (with unedited computer-generated English translation), 11 pages.

* cited by examiner

PHOTOGRAPHY AND THERMOGRAPHY COMBINING METHOD OF OBTAINING A FITTING PARAMETER TO FIT AN OPHTHALMIC LENS INTO A SPECTACLE FRAME

TECHNICAL FIELD

This disclosure generally pertains to the field of ophthalmic optics. More precisely, the present disclosure relates to the manufacturing, ordering and adjustment of spectacle frames as well as the exact mounting of spectacle lenses into spectacle frames.

BACKGROUND ART

Document WO 2020/064755 A1 discloses a method of determining the fitting height of a spectacle frame for a given wearer, cf. in particular page 16, lines 4 ff., as well as FIGS. 2 and 4. In this method, a photograph of the wearer's head 50 with the chosen spectacle frame is taken using the camera 12 of a smart phone 10. The fitting height is then determined by measuring, in the taken photograph, the distance between the centre of one pupil and the bottom edge of the frame or of the corresponding lens.

This method has the drawback that it is sometimes difficult to clearly identify said bottom edge in the photograph. Indeed, under poor lighting conditions and/or in case of little contrast between skin colour and frame colour, a given spectacle frame is barely visible in the photograph. This problem is even worse with spectacles that have a rimless frame where one must identify the bottom edge of a transparent lens.

Further background art is mentioned in the citation list at the end of the present description.

SUMMARY

It is therefore an object of the present disclosure to provide a more robust photographic method of obtaining fitting parameters.

According to the present disclosure, this object is achieved with a photography and thermography combining method of obtaining, for the chosen spectacle frame model of a spectacle wearer, at least one fitting parameter to fit an ophthalmic lens into the spectacle frame model, the method comprising the following steps:

a) taking a photograph of the wearer's face with spectacles having the chosen spectacle frame model;

b) taking a thermogram of the wearer's face with said spectacles;

c) identifying the spectacles' contour in the thermogram;

d) overlaying 1) the identified contour or 2) a boxing shape derived from the identified contour onto the photograph, thus obtaining a composite image;

e) obtaining the at least one fitting parameter from the composite image.

Indeed, by not only taking a photograph but also a thermogram, one obtains a much better image of the outline of the spectacles. This is because the thermal infrared radiation, which is emitted by the whole face of the spectacle wearer, is blocked in the facial regions that are covered by the spectacles. Accordingly, in the thermogram, the outline of the spectacles appears clearly and can be easily derived therefrom.

The following features can be optionally implemented, separately or in combination:

at least step c) is carried out by a computer-implemented image processing algorithm;

when carrying out step c), the image processing algorithm comprises the steps of, i) converting the thermogram into a binary image by classifying each of the thermogram's pixels into a first pixel category if the pixel's intensity is above a predetermined threshold, or into a second pixel category if the pixel's intensity is below the predetermined threshold, ii) identifying the spectacles' contour in the binary image by edge detection;

when carrying out step c), the image processing algorithm comprises the further step of, after step i) and prior to step ii), assigning pixel clusters in the binary image of one pixel category, which are below a predetermined size, to the other pixel category;

detecting the face boundary in the photograph, and wherein, when carrying out step c), the image processing algorithm comprises the further step of, after step i) and prior to step ii), assigning all pixels in the binary image, which belong to the second pixel category and are located outside the face boundary, to the first pixel category;

identifying the eyes region in the photograph, and wherein, when carrying out step c), the image processing algorithm applies step i) only to the part of the thermogram that corresponds to the identified eyes region;

at least a part of the image processing algorithm is based on supervised machine learning;

in alternative 1) of step d), step d) involves the detection of the same section of the spectacle frame, such as the frame bridge, in both the photograph and the identified contour, and using the detected frame section for positioning the identified contour on the photograph;

the obtained at least one fitting parameter is a measure of the position of the wearer's eyes relative to the spectacles, such as the fitting height.

The present disclosure also relates to an electronic device for obtaining, for the chosen spectacle frame model of a spectacle wearer, at least one fitting parameter to fit an ophthalmic lens into the spectacle frame model, the device comprising:

a photographic camera adapted for taking a photograph of the wearer's face with spectacles having the chosen spectacle frame model;

a thermographic camera adapted for taking a thermogram of the wearer's face with said spectacles;

a memory storing an image processing algorithm comprising the steps of:

i) identifying the spectacles' contour in the thermogram;

ii) overlaying the identified contour or a boxing shape derived from the identified contour onto the photograph, thus obtaining a composite image; and iii) obtaining the at least one fitting parameter from the composite image; and a processor adapted to execute the image processing algorithm stored in the memory.

In particular, the electronic device may be a smartphone, a tablet or a measuring instrument dedicated for eye care professionals.

The present disclosure also relates to computer software comprising instructions to implement the above-defined method when the software is executed by a processor.

The present disclosure also relates to a computer-readable non-transient storage medium carrying said computer software.

Definitions

In the context of the present disclosure, the term "photograph" refers to an image taken with a photographic camera in the visible part of the electromagnetic spectrum. This visible part covers wavelengths from about 400 to about 800 nm.

The term "thermogram" refers to an image taken with a thermographic camera in the thermal infrared part of the electromagnetic spectrum. This thermal infrared part covers wavelengths from about 3 to about 15 μm.

The term "boxing shape" is used in reference to the boxed lens system as defined in ISO standard 8624:2020(en), which is hereby incorporated by reference into the present application. The boxing shape is the pair of rectangular boxes that circumscribe the two lens shapes of a pair of spectacles.

The term "fitting height" refers to the vertical distance between the centre of the pupil of an eye of a spectacle wearer and the bottom edge of the corresponding lens or frame of the spectacles worn by the wearer.

BRIEF DESCRIPTION OF DRAWINGS

Embodiments of the present disclosure will now be described in detail with reference to the appended drawings, in which.

DESCRIPTION OF EMBODIMENTS

Figure 1:
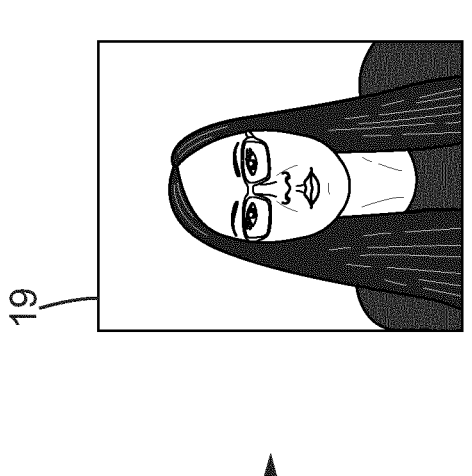
FIG. 1 is a schematic view from above of a photographic setup according to the present disclosure.
Figure 1:
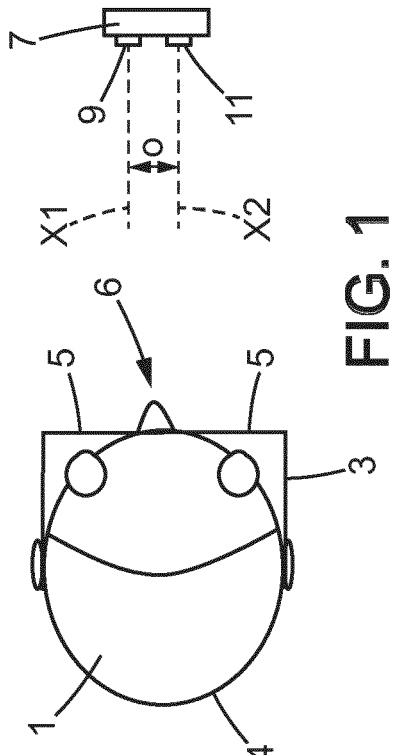

FIG. 1 shows a basic setup according to the present disclosure that may be used to obtain one or more fitting parameters to fit an ophthalmic lens into a given spectacle frame. This setup may be used in a typical case where a spectacle wearer 1 is at the shop of an eye care professional to buy a new pair of spectacles.

In this typical case, the spectacle wearer 1 chooses a spectacle frame model 3 among the frame models on display in the shop. To be able to then fit ophthalmic lenses corresponding to the spectacle wearer's prescription into the chosen frame model, the eye care professional needs to obtain a set of fitting parameters. These fitting parameters depend on the chosen frame model and on the spectacle wearer's individual morphology.

In order to have the right setup for obtaining at least some of these fitting parameters, the eye care professional and the spectacle wearer 1 may go through the following routine:

Firstly, the eye care professional provides the spectacle wearer 1 with a specimen of the chosen frame model 3. This specimen 3 has two arbitrary lenses 5 fitted therein. The lenses 5 may be dummy lenses without any refractive power.

Secondly, the spectacle wearer 1 puts on the specimen 3.

Lastly, with the dummy spectacles 3 correctly positioned on her head 4, the spectacle wearer 1 positions her face 6 in front of a camera device 7. The spectacle wearer 1 is then in the setup shown in FIG. 1.

The camera device 7 is an electronic device for obtaining, for the chosen spectacle frame model 3 of the spectacle wearer 1, at least one fitting parameter to fit an ophthalmic lens into the spectacle frame model 3.

Figure 3:
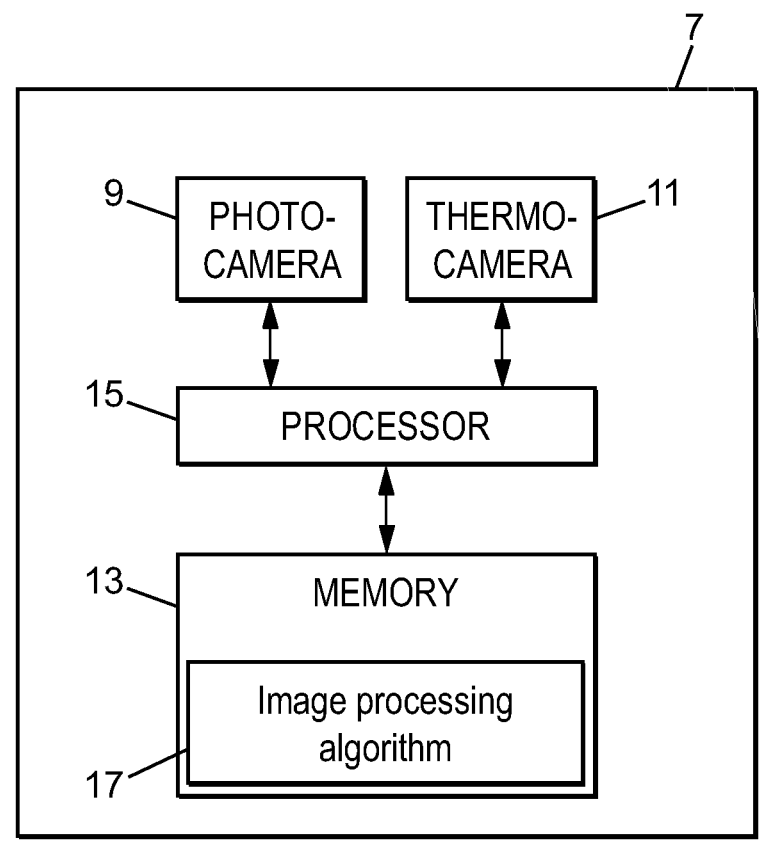
FIG. 3 is a block diagram of an electronic device according to the present disclosure.

With reference to FIG. 3, the camera device 7 comprises a photographic camera 9, a thermographic camera 11, a memory 13 and a processor 15. The memory 13 has an image processing algorithm 17 stored therein. The processor 15 is adapted to execute the image processing algorithm 17 stored in the memory 13. At least a part of the image processing algorithm 17 may be based on supervised machine learning.

The camera device 7 may be a smartphone, a tablet or a measuring instrument dedicated for eye care professionals. In particular, the camera device 7 may be an electronic measuring column. Such columns are typically installed in opticians' shops and are part of the optician's measuring equipment.

Figure 2A:
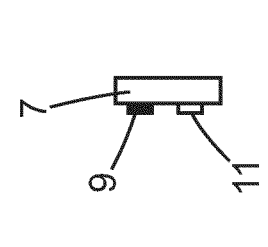
FIGS. 2a to 2f show the different steps of a photography and thermography combining method according to the present disclosure.
Figure 2A:
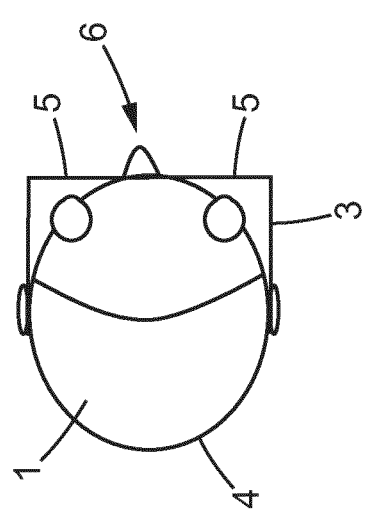

Starting with the setup shown in FIG. 1, a method according to the present disclosure of obtaining at least one fitting parameter involves the following steps:

Firstly, using its photographic camera 9, the camera device 7 takes a photograph 19 of the face 6 of the spectacle wearer 1 with the spectacles 3. This is illustrated in FIG. 2a. The photographic camera 9 is coloured in black to indicate that it is operated.

Figures 2B, 2C, 2D, 2E:
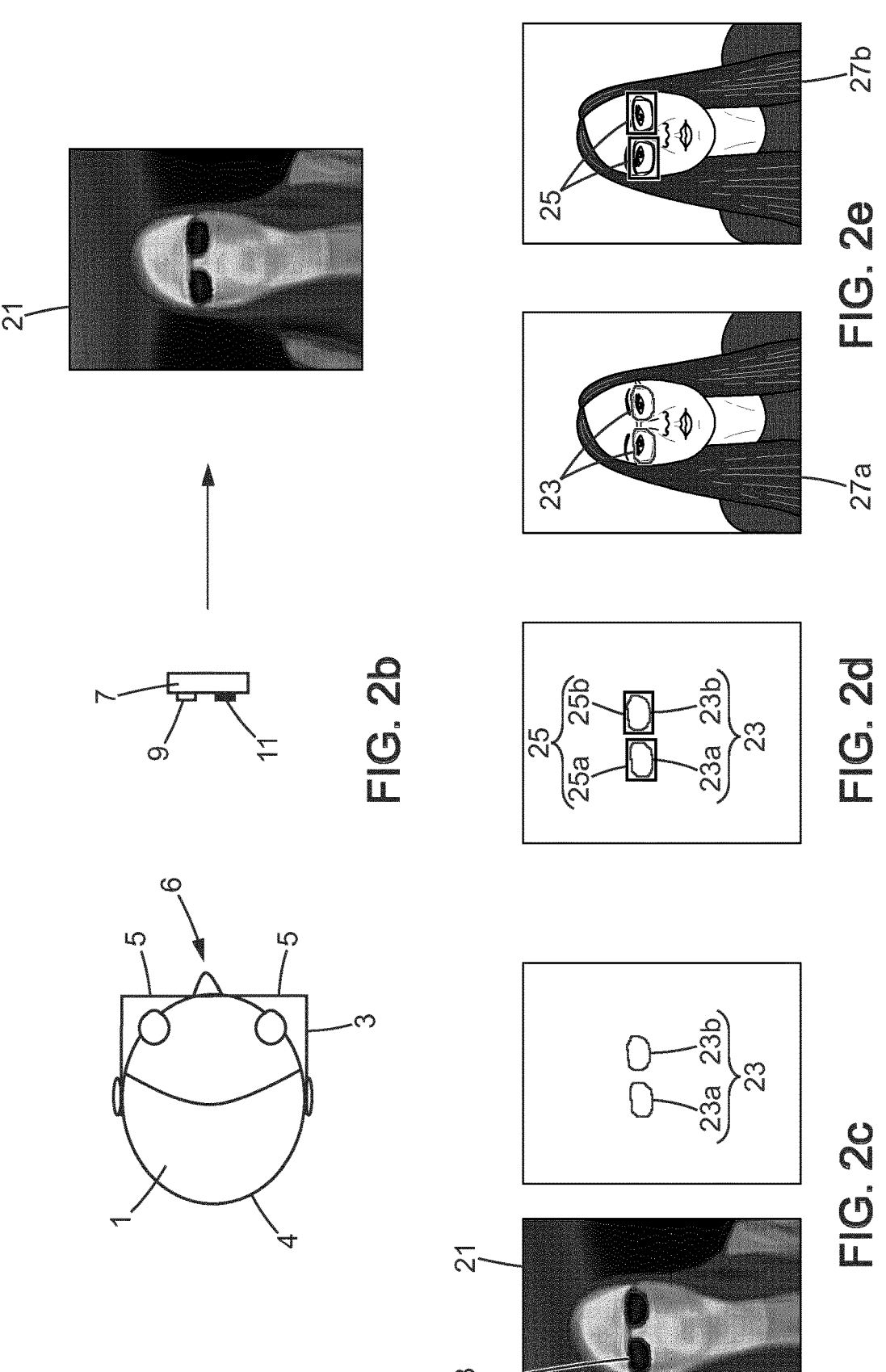

Secondly, using its thermographic camera 11, the camera device 7 takes a thermogram 21 of the face 6 of the spectacle wearer 1 with the spectacles 3. This is illustrated in FIG. 2b. The thermographic camera 11 is coloured in black to indicate that it is operated.

Both the photograph 19 and the thermogram 21 are stored in the device's memory 13.

Next, the processor 15 executes the image processing algorithm 17. This image processing corresponds to the subsequent steps of the fitting parameter obtaining method. These subsequent steps are as follows:

As shown in FIG. 2c, the thermogram 21 is analysed in order to identify therein the contour 23 of the spectacles 3. The left-hand side of FIG. 2c is a picture highlighting the identified contour 23 in the thermogram 21. The picture on the right-hand side of FIG. 2c shows the identified contour 23 in isolation. In the shown example, the identified contour 23 consists of two similar closed shapes 23a, 23b. Each shape 23a, 23b corresponds to the outline of one of the spectacles' two lenses.

In an optional step shown in FIG. 2d, a boxing shape 25 is derived from the identified contour 23. The boxing shape 25 consists of two rectangles 25a, 25b. Each rectangle 25a, 25b encloses one of the two closed shapes 23a, 23b. The image processing algorithm 17 determines the rectangles 25a, 25b in accordance with the boxed lens system, as defined in ISO standard 8624:2020(en).

Then, as shown in FIG. 2*e*, the image processing algorithm 17 overlays either the identified contour 23 or the boxing shape 25 onto the photograph 19 to obtain a composite image 27. The picture on the left-hand side of FIG. 2*e* shows a composite image 27*a* with a contour overlay, and the picture on the right-hand side of FIG. 2*e* shows a composite image 27*b* with a boxing shape overlay.

Figure 2F:
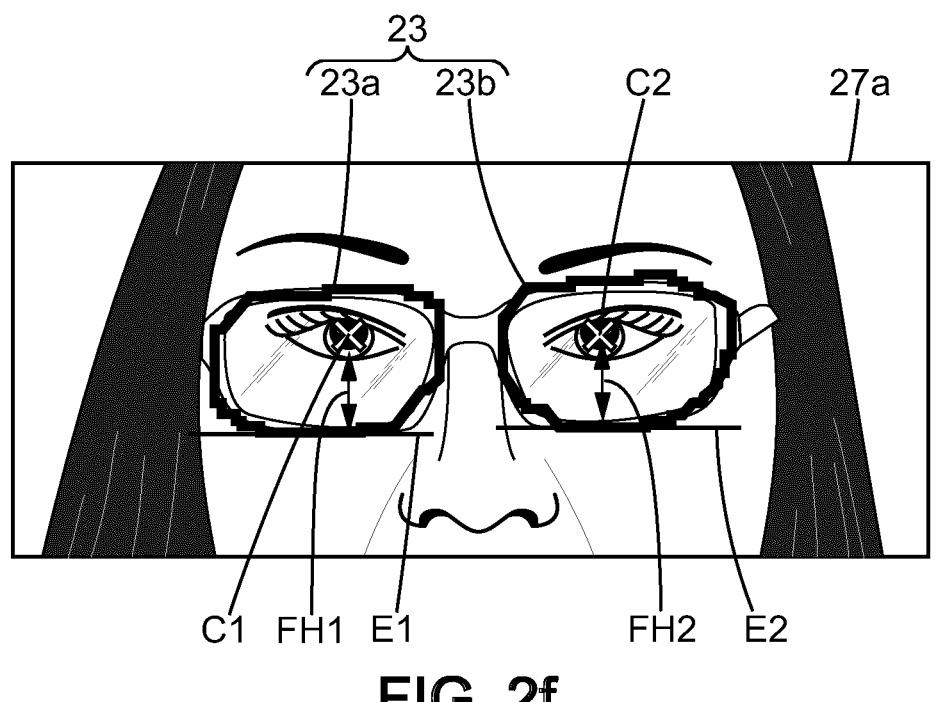

In the last step illustrated in FIG. 2*f*, the image processing algorithm 17 obtains at least one fitting parameter from the composite image 27. The obtained one or more fitting parameters are measures of the position of the wearer's eyes relative to the spectacles 3, such as the fitting height.

In FIG. 2*f*, the fitting parameter, which is determined, is the fitting height FH. To this end, in the composite image 27*a*, the image processing algorithm 17 identifies the centres C1 and C2 of the wearer's pupils, as well the bottom edges E1 and E2 of the contour 23. The obtained fitting height may correspond to the vertical distance FH1 between the right centre C1 and the corresponding right bottom edge E1, or to the vertical distance FH2 between the left centre C2 and the corresponding left bottom edge E2, or to the average of FH1 and FH2.

The step of obtaining the fitting parameter may also be performed on the alternative composite image 27*b*, which has an overlaid boxing shape 25.

Figure 4:
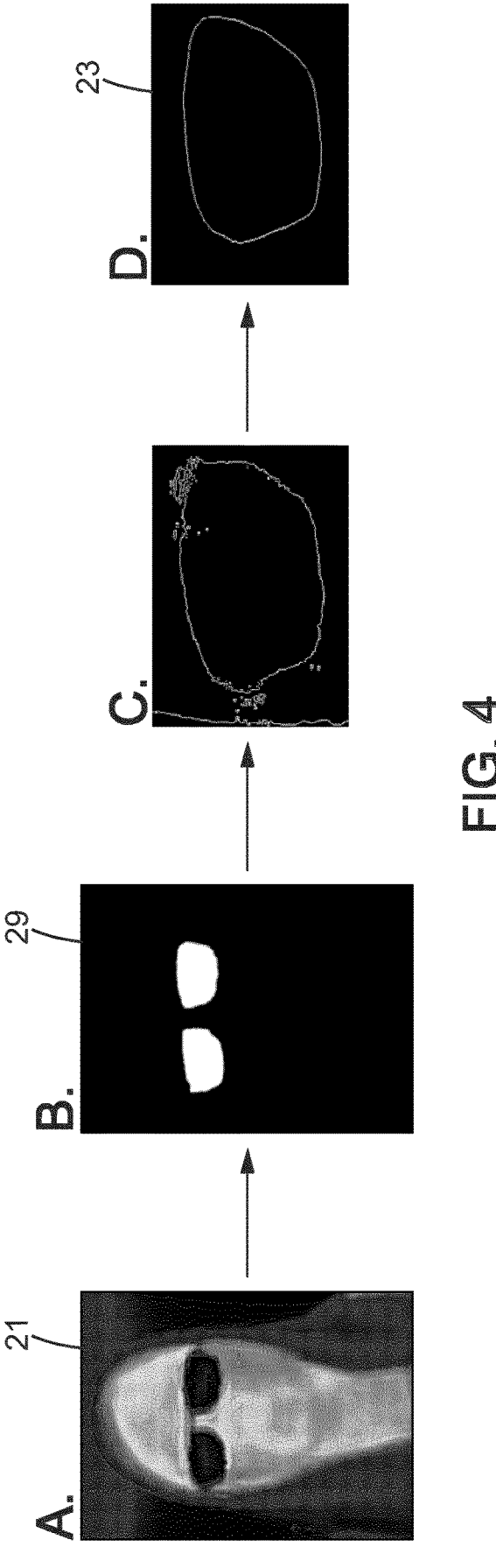
FIG. 4 illustrates how, according to the present disclosure, a spectacles' contour is identified in a thermogram via thresholding and edge detection.

Reference is now made to FIG. 4, which provides an example of how the image processing algorithm 17 may identify the contour 23 of the spectacles 3 in the thermogram 21.

In this example, the contour 23 is identified by two consecutive image processing steps:

Firstly, the thermogram 21 is converted into a binary image 29 using a thresholding technique. More precisely, each of the thermogram's pixels is classified into a first pixel category if the pixel's intensity is above a predetermined threshold, or into a second pixel category if the pixel's intensity is below the predetermined threshold. This step is illustrated by pictures A and B in FIG. 4.

Secondly, the contour 23 is identified in the binary image 29 by edge detection. This is illustrated by pictures C and D in FIG. 4. Pictures C and D only show the edge detection as applied to a detail of the binary image 29, but the same process is of course applied to the whole binary image 29.

The edge detection may be split into two sub-steps, namely a first sub-step of extracting the edges from the binary image 29, the result of which is shown in picture C of FIG. 4, and a second sub-step of smoothing the extracted edges, the result of which is shown in picture D of FIG. 4.

Figure 5:
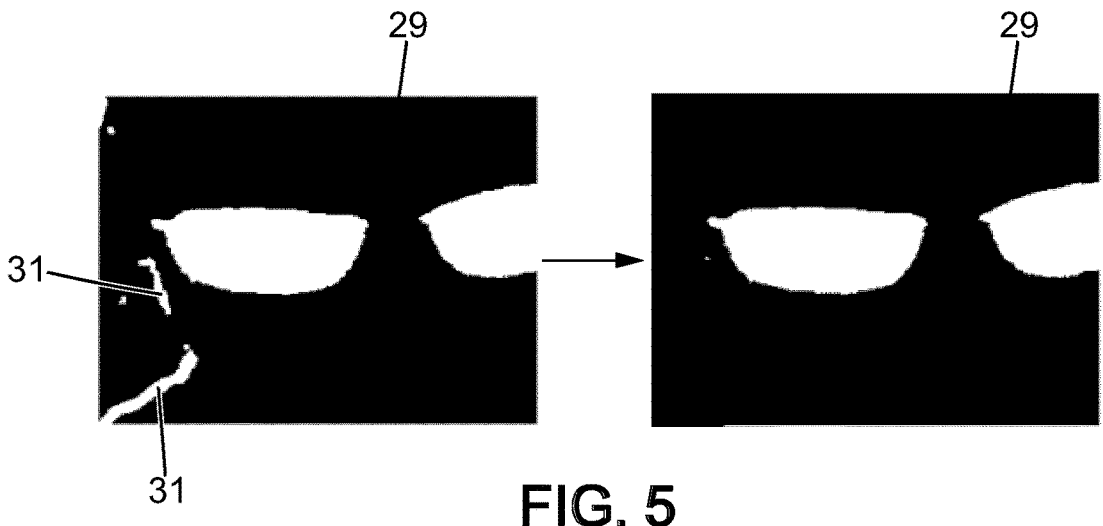
FIG. 5 illustrates the removal of image artefacts according to an embodiment of the present disclosure.

The binary image 29 obtained by thresholding may contain small pixel clusters 31, cf. FIG. 5. These small pixel clusters 31 are unwanted artefacts, which potentially distort the result of the edge detection. To address this, a first intermediate step illustrated by FIG. 5 may be performed after the thresholding step and prior to the edge detection step. This first intermediate step removes small pixel clusters 31 from the binary image 29 by assigning pixel clusters in the binary image 29 of one pixel category, which are below a predetermined size, to the other pixel category.

Figure 6:
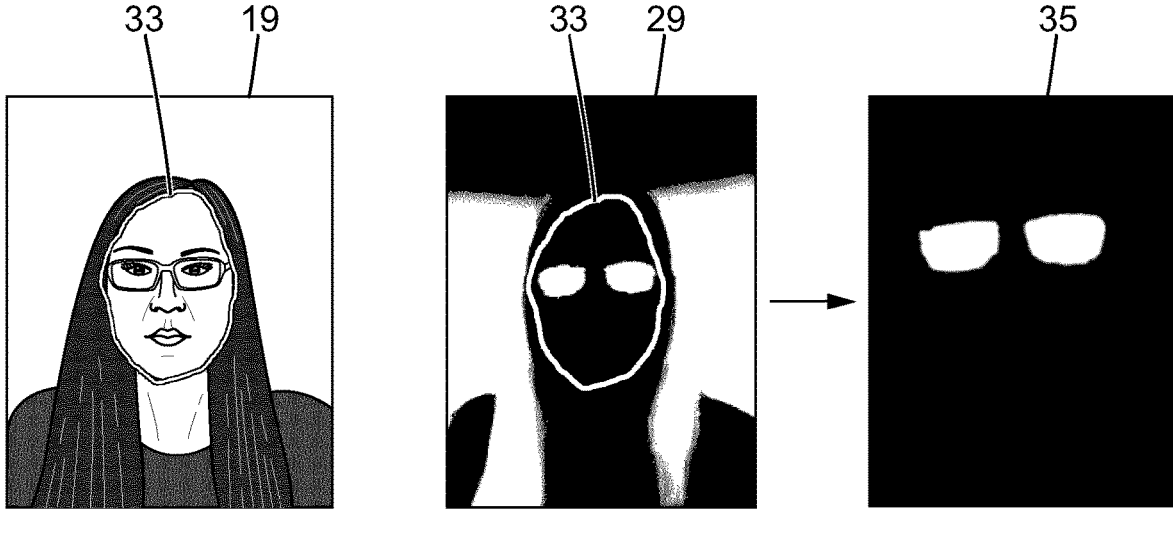
FIG. 6 illustrates how, according to the present disclosure, face boundary detection can assist in binarizing a thermogram.

As a further way of making the binary image 29 more amenable to edge detection, a second intermediate step illustrated by FIG. 6 may performed in addition or as an alternative to the first intermediate step. Uke the first intermediate step, the second intermediate step is performed after the thresholding step and prior to the edge detection step. The second intermediate step relies on the available photo-graph 19. More precisely, in the second intermediate step, the boundary 33 of the wearer's face is detected in the photograph 19, and all pixels in the binary image 29, which belong to the second pixel category and are located outside the face boundary 33, are assigned to the first pixel category.

In FIG. 6, the binary image 29 is a black-and-white image, wherein "black" is the first pixel category and "white" is the second pixel category. In this case, the result of the second intermediate step is to convert all white pixels in the binary image 29, which are outside the face boundary 33, to black pixels. The right-hand picture in FIG. 6 shows the resulting purified binary image 35.

Figure 7:
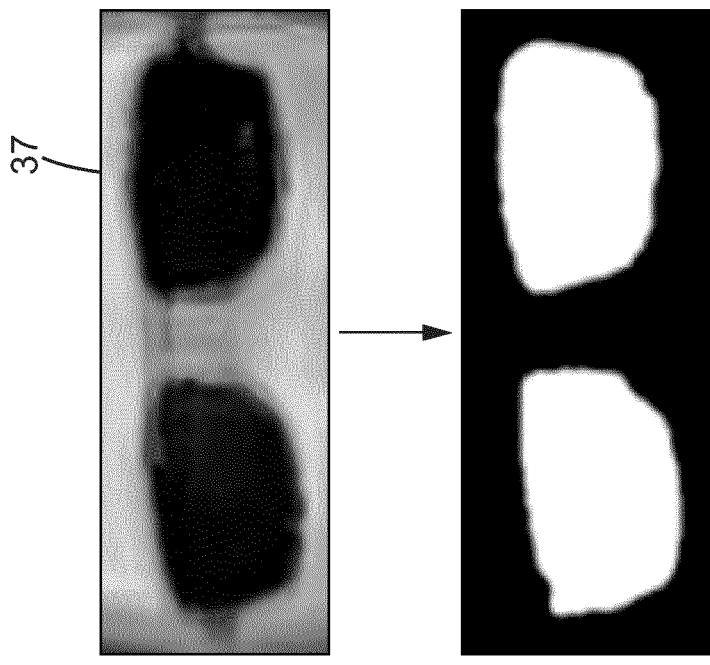
FIG. 7 illustrates an embodiment wherein the thresholding is only applied to a region of a thermogram that has been identified as the eyes region.
Figure 7:
Figure 7:
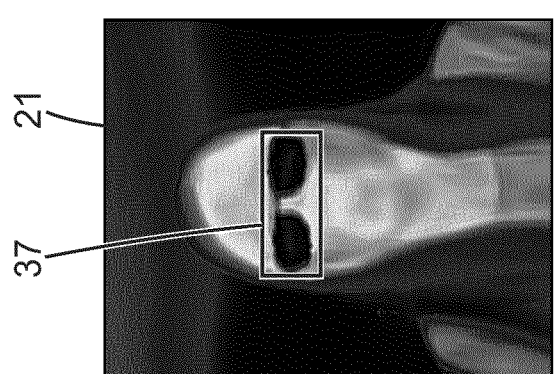
Figure 7:
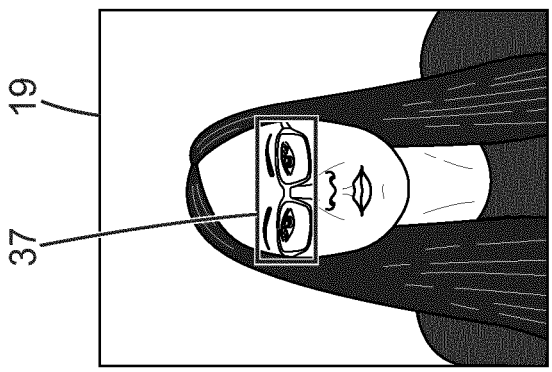

In order to simplify the thresholding and edge detection, cf. FIG. 7, the image processing algorithm 17 may first identify the eyes region 37 in the photograph 19 and then apply the thresholding only to the part of the thermogram 21 that corresponds to the identified eyes region 37.

Sometimes, the photograph 19 and the thermogram 21 may not be perfectly aligned, for example when there is an offset O between the optical axis X1 of the photographic camera 9 and the optical axis X2 of the thermographic camera 11 (cf. FIG. 1). In order to compensate for this, the step of overlaying the spectacle contour 23 onto the photograph 19 may involve the detection of the same section of the spectacle frame in both the photograph 19 and the identified contour 23, and using the detected frame section for positioning the identified contour 23 on the photograph 19. This variant is illustrated by FIG. 8.

Figure 8:
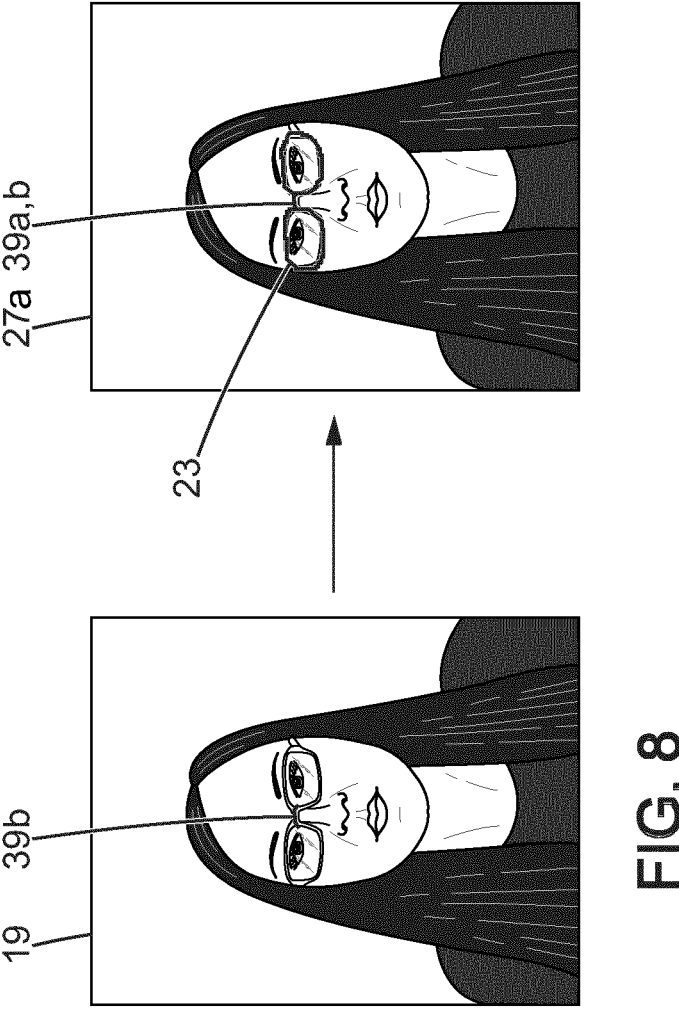
FIG. 8 illustrates the positioning, according to an embodiment of the present disclosure, of a spectacle contour on a photograph using a detected frame section.
Figure 8:
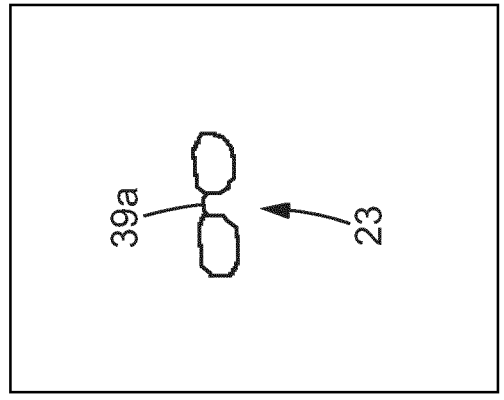

In the example of FIG. 8, the detected frame section is the frame bridge 39. During the overlaying step, the position of the contour 23 on the photograph 19 is shifted until the frame bridge 39*a* of the contour 23 lies on top of the frame bridge 39*b* of the photograph 19.

Summarising, methods and electronic devices in accordance with the present disclosure advantageously combine thermography with the already established photography to considerably improve the determination of ophthalmic fitting parameters.

CITATION LIST

Patent Literature Documents

WO 2020/064755 A1.

Non-Patent Literature

ISO standard 8624:2020(en);

Yufeng Zheng, "Face detection and eyeglasses detection for thermal face recognition", Proceedings of SPIE—The International Society for Optical Engineering—February 2012;

Rolf-Rainer Grigat et al., "Robust eye detection under active infrared illumination", Proceedings of the 18th International Conference on Pattern Recognition, 2006; and George Bebis et al., "Face recognition by fusing thermal infrared and visible imagery", Image and Vision Computing, 24 (2006), 727-742.

The invention claimed is:

1. A photography and thermography combining method of obtaining, for a chosen spectacle frame model of a spectacle wearer, at least one fitting parameter to fit an ophthalmic lens into the spectacle frame model, the method comprising:

a. taking a photograph of the wearer's face with spectacles having the chosen spectacle frame model;

b. taking a thermogram of the wearer's face with said spectacles;

c. identifying the spectacles' contour in the thermogram;

d. overlaying 1) the identified contour, or 2) a boxing shape derived from the identified contour onto the photograph, thus obtaining a composite image; and e. obtaining the at least one fitting parameter from the composite image.

2. The method of claim 1, wherein at least c) is carried out by a computer-implemented image processing algorithm.

3. The method of claim 2, wherein, when carrying out c), the image processing algorithm comprises:

i) converting the thermogram into a binary image by classifying each of the thermogram's pixels into a first pixel category if the pixel's intensity is above a predetermined threshold, or into a second pixel category if the pixel's intensity is below the predetermined threshold; and ii) identifying the spectacles' contour in the binary image by edge detection.

4. The method of claim 3, wherein, when carrying out c), the image processing algorithm comprises, after i) and prior to ii), assigning pixel clusters in the binary image of one pixel category, which are below a predetermined size, to the other pixel category.

5. The method of claim 3, further comprising detecting a face boundary in the photograph, and wherein, when carrying out c), the image processing algorithm comprises, after i) and prior to ii), assigning all pixels in the binary image, which belong to the second pixel category and are located outside the face boundary, to the first pixel category.

6. The method of claim 3, further comprising identifying eyes region in the photograph, and wherein, when carrying out c), the image processing algorithm applies i) only to a part of the thermogram that corresponds to the identified eyes region.

7. The method of claim 2, wherein at least a part of the image processing algorithm is based on supervised machine learning.

8. A non-transitory computer-readable storage medium including computer executable instructions, wherein the instructions, when executed by a computer, cause the computer to perform the method according to claim 2.

9. The method of claim 1, wherein, in 1) of d), d) involves detection of a same section of a spectacle frame in both the photograph and the identified contour, and using the detected frame section for positioning the identified contour on the photograph.

10. The method of claim 1, wherein the obtained at least one fitting parameter is a measure of a position of the wearer's eyes relative to the spectacles.

11. A non-transitory computer-readable storage medium including computer executable instructions, wherein the instructions, when executed by a computer, cause the computer to perform the method according to claim 1.

12. The method of claim 1, wherein, in 1) of d), d) involves detection of a frame bridge of a spectacle frame in both the photograph and the identified contour, and using the detected frame bridge for positioning the identified contour on the photograph.

13. The method of claim 1, wherein the obtained at least one fitting parameter is a fitting height.

14. An electronic device for obtaining, for a chosen spectacle frame model of a spectacle wearer, at least one fitting parameter to fit an ophthalmic lens into the spectacle frame model, the device comprising:

a photographic camera configured to take a photograph of the wearer's face with spectacles having the chosen spectacle frame model;

a thermographic camera configured to take a thermogram of a wearer's face with said spectacles;

a memory storing an image processing algorithm comprising:

i) identifying the spectacles' contour in the thermogram;

ii) overlaying the identified contour or a boxing shape derived from the identified contour onto the photograph, thus obtaining a composite image; and iii) obtaining the at least one fitting parameter from the composite image; and a processor configured to execute the image processing algorithm stored in the memory.

15. The electronic device of claim 14, wherein the electronic device is a smartphone, a tablet or a measuring instrument dedicated for eye care professionals.

\* \* \* \* \*